Oct. 12, 1965  E. B. GASSER  3,211,336
AUTOMATIC INTERMITTENT DISCHARGE CONTROL MECHANISM
Filed Oct. 16, 1963  7 Sheets-Sheet 1

FIG. 1

INVENTOR
EDWARD BRUCE GASSER
BY Strauch, Nolan & Neale
ATTORNEYS

INVENTOR
EDWARD BRUCE GASSER
BY Strauch, Nolan & Neale
ATTORNEYS

FIG. 6

INVENTOR
EDWARD BRUCE GASSER

United States Patent Office 3,211,336
Patented Oct. 12, 1965

3,211,336
AUTOMATIC INTERMITTENT DISCHARGE
CONTROL MECHANISM
Edward Bruce Gasser, 406 Willow Ave., Piscataway
Township, Middlesex County, N.J.
Filed Oct. 16, 1963, Ser. No. 316,609
17 Claims. (Cl. 222—52)

This invention is concerned with arrangements for automatically discharging the contents of a pressurized container such as an aerosol type container and is particularly concerned with special cyclically operated discharge control mechanism powered by the pressure of the contents of the container.

It has been proposed to automatically intermittently discharge the contents of an aerosol or like container but prior to the invention the proposed apparatus for accomplishing such has mainly comprised self-timed intermittent mechanism powered by a clockwork or the like. This apparatus, besides requiring relatively expensive clockwork, must be wound up or similarly energized periodically. Some devices have been proposed which employ the pressure of the container contents to actuate the intermittent discharge control but these all involve relatively complex valve and associated control structure.

The present invention provides a relatively simple reliable mechanism for automatically periodically discharging the contents of a pressurized container under control of pressure derived from the container, so that it is always operable without attention during the entire period that the container is being discharged of its contents.

It is therefore the major object of this invention to provide a novel arrangement for automatically periodically discharging the contents of a pressurized container under control of pressure derived from the container.

Another object of the invention is to provide a novel removable attachment for a conventional type pressurized container which contains control means automatically connected to receive pressurized contents of the container when mounted upon the container.

A further object of the invention is to provide a novel discharge apparatus adapted when mounted on a pressurized container to be automatically charged with a predetermined amount of the contents of said container, and including timed means for discharging said charge.

Another object of the invention is to provide a novel removable attachment for a pressurized container which may be set to discharge the container contents either periodically or substantially continually.

It is yet another object of the invention to provide apparatus for automatically periodically discharging the contents of a pressurized container comprising a novel combination of charging chamber and related passages and valves with mechanism cyclically operated and powered by the pressure of the container contents for controlling said valves to charge and discharge said chamber.

Further objects of the invention will appear as the description proceeds in connection with the appended claims and the annexed drawings wherein:

Figure 1:
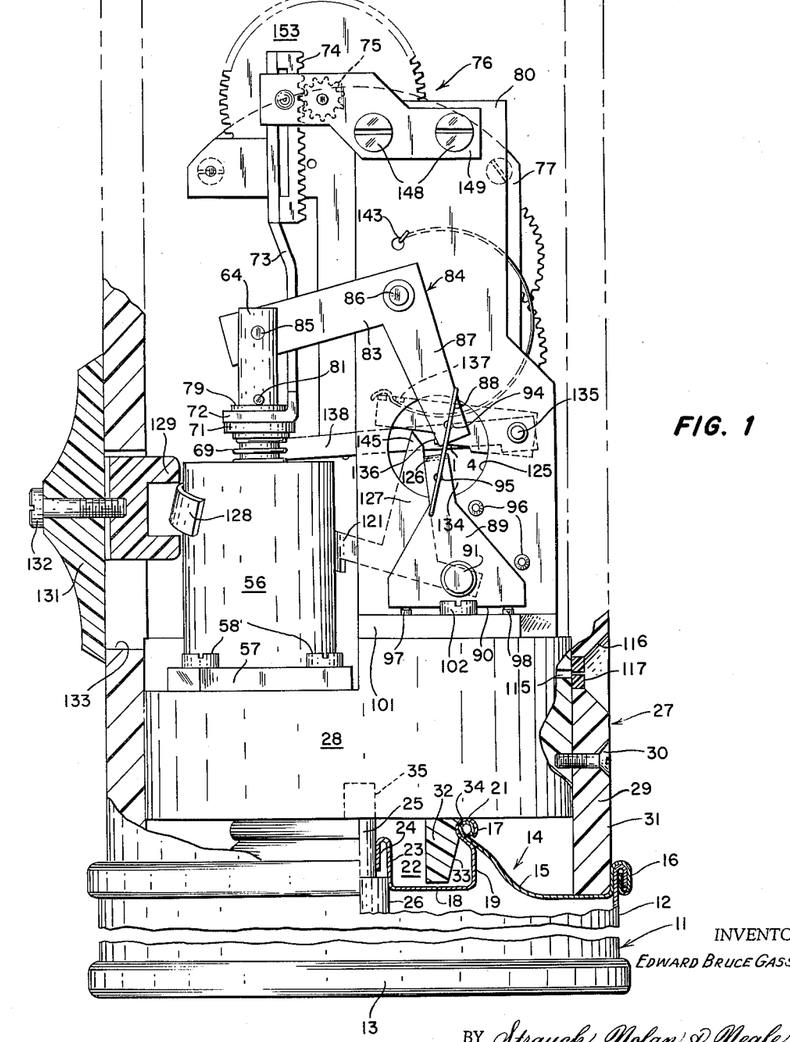
FIGURE 1 is a side elevation partially broken away and in section showing a preferred embodiment of the invention with the mechanism shown in the off position wherein no discharge of the container contents is desired.

Referring first to FIGURE 1, the invention is embodied in association with a pressurized container 11 of the so-called aerosol type. Container 11 comprises a body 12 having a gas tight bottom closure 13 and a top cover assembly 14 comprising an outer annulus 15 having its outer periphery clenched gas tight at bead 16 around the upper end of the wall of body 12 and formed at its inner periphery with an upstanding annular bead 17. An annular well defining member 18 has an outer upright wall 19 clenched at its upper end gas tight over bead 17 to form an annular rounded bead 21 that projects radially inwardly of the well 22. Around its inner periphery member 18 has an upright wall 23 that is reversely downwardly bent at 24 to form an open mouth slidably guiding the hollow valve stem 25 (see FIGURE 4 also).

Figure 4:
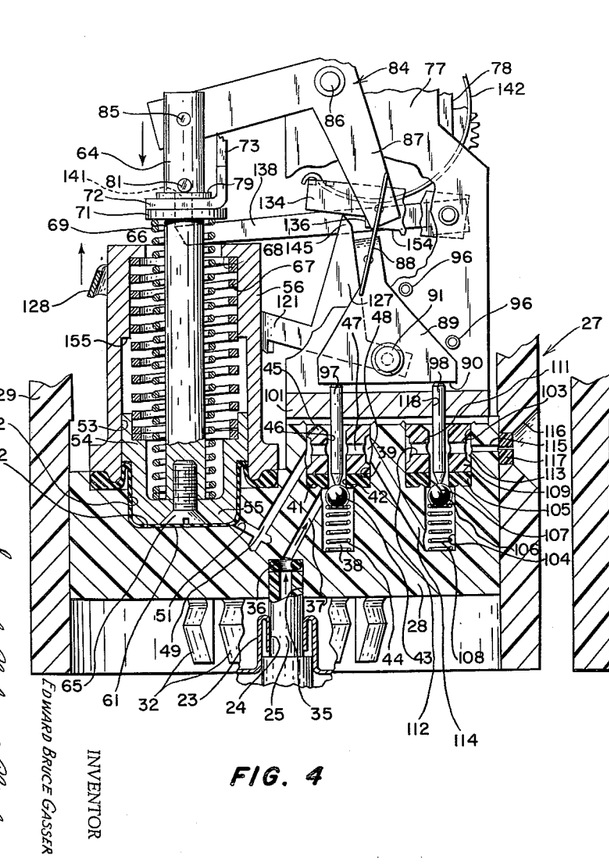
FIGURE 4 is an enlarged fragmentary side partly broken away and in section showing the valves and passages and related discharge control mechanism in the off position of FIGURE 1.
Figure 5:
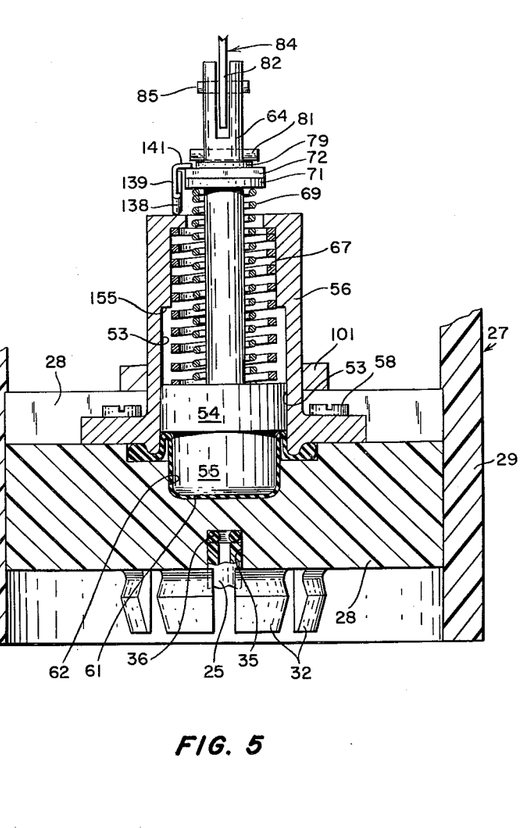
FIGURE 5 is an enlarged section taken at right angles to FIGURE 4 showing the piston and cylinder structures of the mechanism.

Valve stem 25 extends upward from a suitable valve assembly 26 which contains a spring (not shown upwardly biasing stem 25 and is fixedly mounted within the container. Valve 26 is of such character that depression of stem 25 toward the interior of the container permits discharge of the contents of the container through stem 25.

The container top closure and valve assembly above described is preferably any conventional type, so that the attachment to be described has almost universal use on containers from different sources, and may be for example that disclosed in U.S. Letters Patent to Abplanalp No. 2,631,814 issued March 17, 1953 to which reference is made for more detail.

The invention comprises a readily removable attachment 27 having a cylindrical base 28 upon which is secured a hollow cylindrical closure member 29, as by screws 30. Discharge control mechanism is mounted on base 28 within the closure member, and the lower end of closure member 29 depends from the base to provide a skirt 31 extending snugly within outer container bead 16.

The attachment 27 is secured upon container 11 by a resilient socket assembly comprising a circular row of spaced socket fingers 32 extending from base 28 into well 22. Each finger is fixed at its upper end to base 28 and has a downwardly inwardly sloping cam face 33 and above face 33 a rounded outwardly open recess 34. As shown in FIGURE 4, stem 25 extends snugly up into a bottom bore 35 in base 28 into abutment with a resilient O-ring valve seat 36, for a purpose to appear.

The circumferentially aligned faces 33 constitute a circular camming ring whereby the fingers 32 are slightly bent inwardly as they encounter the relatively stiff bead 21 during axial assembly of the attachment onto the container, and the circumferentially aligned recesses 34 constitute an annular locking formation coacting with bead 21 to grip the fingers when they are thrust sufficiently into the well.

The centered valve stem 25 at the same time enters bore 35. While the resilient socket engagement at bead 21 serves chiefly to hold the attachment on the container it is aided and stabilized by the snug fit of skirt 31 within bead 16.

Preferably the container top members 15 and 18 are stiff sheet metal elements, and fingers 31 are integral projections from block 28 which may be any suitable tough machineable plastic that provides an inherent adequate resilient stiffness in the fingers.

Referring to FIGURE 4, when the attachment 27 is being mounted on the container, the dimensions of the parts are such that hollow valve stem 25 bottoms on seat ring 36 before the recesses 34 reach bead 21, and further movement causes depression of the stem 25 into the container sufficiently to open the valve 26 by the time the attachment is secured by bead 21. Thus the act of mounting the attachment 27 on container 11 automatically opens the control valve of the container, so that the contents under container pressure will discharge through stem 25 and seat 36 into an inclined base passage 37 as shown by the arrows in FIGURE 4.

Passage 37 enters the upper end of a chamber 38 that constitutes a reduced diameter extension of an upwardly open recess 39 formed in the base 28. An annular valve seat 41 of rigid plastic is mounted in the bottom of recess 39 to bridge the upper end of chamber 38 except for its central opening 42 which may be engaged by a spherical ball valve element 43 upwardly biased by spring 44 in chamber 38. In the off position of the parts shown in FIGURES 1–5 ball 43 seats tightly and no pressure escapes chamber 38.

Valve seat 41 is held in place by an annular plug member 45 that is press fitted or similarly fixed within recess 39 with its axially central bore 46 aligned with valve seat opening 42. A plurality of radial passages 47 extend from bore 46 outwardly and plug 45 is formed around its outer periphery with a shallow channel 48 which forms with the recess wall an annular passage that connects passages 47 with an inclined body passage 49 that turns upwardly at 51 to enter a chamber 52 of a cylinder 53 of a control piston assembly to be described.

Figure 6:
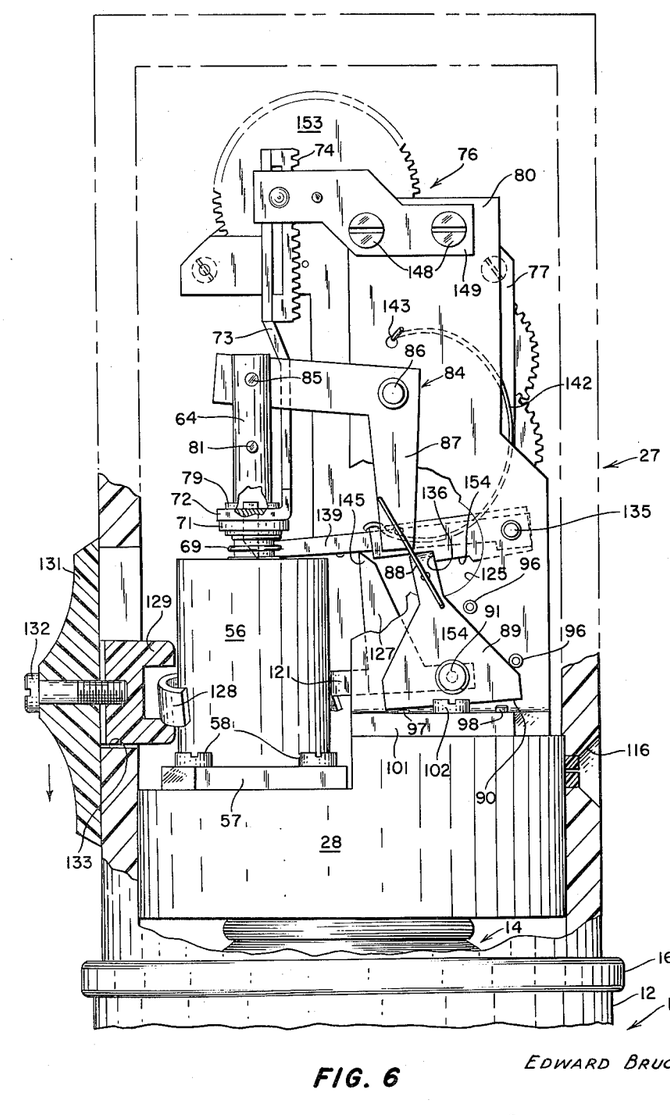
FIGURE 6 is a side elevation like FIGURE 1 but showing the parts of the mechanism in the positions they assume when the control lever has been swung to the on position.

Cylinder 53 contains a slidable piston 54 shown in its lowermost position in FIGURE 4. Piston 54 is generally cup-shaped with its bottom wall 55 of reduced diameter extending into chamber 52 which is mainly formed in body 28. The cylinder comprises mainly an upright tubular housing 56 having a flanged lower end 57 secured to body 28 as by screws 58 (FIGURE 6).

The top wall of body 28 is countersunk at 59 around chamber 52 to receive the beaded periphery 60 of a rubber or like sealing diaphragm 61 that has a generally cup shaped central section 62 surrounding the bottom of piston 54. A depending rib 63 on housing flange 57 engages the beaded periphery of the diaphragm to sealingly clamp the diaphragm gas tight around and over the upper end of chamber 52.

A piston rod 64 has its lower end fixed to the piston bottom wall, as by a screw 65, and extends up through the cylinder and the opening 66 in the upper end of housing 56. Within the cylinder, a powerful coiled return spring 67 of square wire cross-section extends between piston 54 and a housing shoulder 68. This biases the piston toward the FIGURE 1 position.

A smaller diameter coil spring 69 surrounds rod 64 and extends between piston 54 and a nylon washer 71 slidably surrounding rod 64. Above collar 71 rod 64 is slidably surrounded by the foot collar 72 of an upright rack bar 73 on which is secured a toothed rack 74 meshed with the first gear 75 of an escapement assembly designated at 76 and mounted between a pair of rigid parallel vertical carrier plates 77 and 78. A nylon washer 79 slidably surrounds rod 64 above collar 72, and when the parts are in the FIGURE 1 position expanded spring 69 urges the washer 71, collar 72 and washer 79 upward together to abut washer 79 against a radial stop pin 81 on rod 64.

Above pin 81, rod 64 is bifurcated at 82 (FIGURE 5) to pivotally receive one arm 83 of a crank 84 on a pivot pin 85. Crank 84 is pivoted on a support plate 80 at 86, and the other crank arm 87 extends downwardly for connection to one end of a torsion spring 88. The other end of spring 88 is connected to a valve control member 89 pivoted upon plate 80 at 91. Plate 80 is parallel to the escapement mounting plates.

In the preferred embodiment, spring 88 is a generally C-shaped planar spring wire loop having its opposite ends 92 and 93 out-turned in its plane and extending pivotally into openings 94 and 95 respectively in crank arm 87 and valve control plate 89. The pivot axes of the spring ends are parallel and parallel to the pivot axes of crank 84 and plate 89.

As shown in FIGURES 1 and 4 one or more rigid stops 96 are provided on support plate 80 to limit travel of valve plate 89. The lower edge of valve plate 89 below the pivot 91 is in the FIGURE 1 position a substantially horizontal straight edge 90 which extends over the upper ends of two vertically slidable valve actuating pins 97 and 98.

Pin 97 is slidably guided in a vertical bore 99 formed in a top bridge 101 secured upon body 28 as by screws 102.

As shown in FIGURE 4, body 28 is formed with a second large diameter upwardly open recess 103, like that at 29, and a small chamber 104, like that at 38. An annular valve seat 105 in the bottom of recess 103 has an opening 106 normally closed by a spherical valve element 107 biased by spring 108 in chamber 104. Recess 103 is otherwise filled by a press fitted plug 109 having a central bore 111 aligned with opening 106 and connected by radial passages 112 to a shallow annular passage 113. In essence the valve arrangements in recess 103 are the same as in recess 39.

A body passage 114 connects the annular passage at 48 to chamber 104, and a generally horizontal discharge outlet passage 115 through the body leads from annular passage 113 to a flared discharge opening 116 through the side wall of the attachment 27. A nozzle fitting 117 of suitable small diameter bore is used to determine the spray particle size.

The other pin 98 extends slidably through vertical bore 118 in bridge 101, and the pins 97 and 98 similarly freely extend through plug bores 46 and 111 respectively into end abutment with the valve ball elements 43 and 107 respectively.

In the off position of FIGURES 1–5, the ball valves at 43 and 107 are both urged tightly shut, and loosely slidable pins 97 and 98 are displaced upwardly to a position just in contact or short of contact with edge 90 or valve plate 89.

Figure 2:
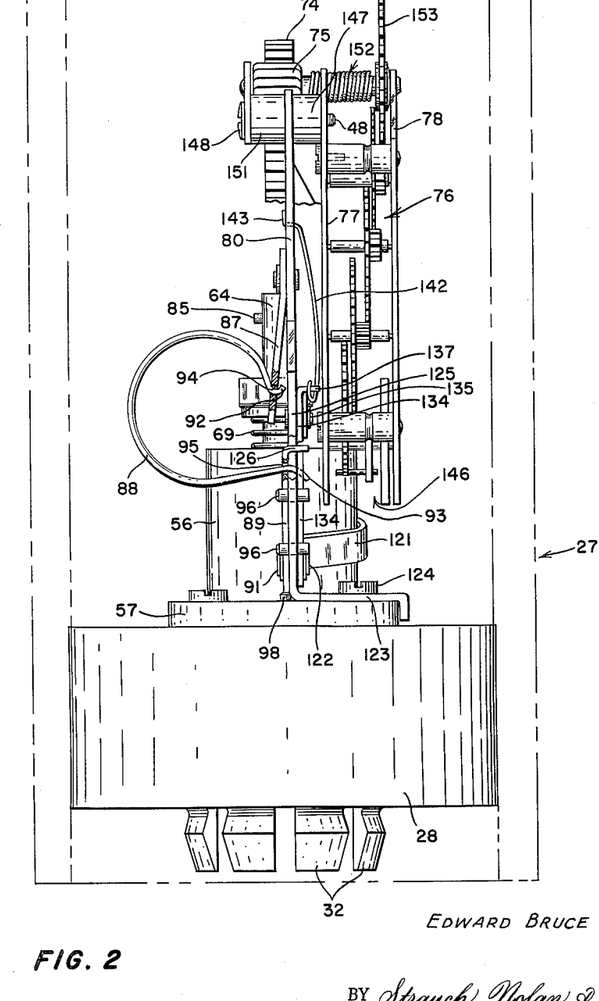
FIGURE 2 is an end elevation of the parts shown in FIGURE 1.

A control lever 121 is pivoted on support plate 80 at 122 coaxially with but on the opposite side from valve plate 89. As shown in FIGURE 2 the lower end of plate 80 is an outwardly bent flange 123 secured as by screw 124 to body 28, and the valve actuating pins 97 and 98 are located adjacent that lower end. An aperture 125 of considerable size is formed through plate 80, and the upper edge of valve plate 89 has an inwardly bent lip 126 projecting through aperture 125 to the inner side of plate 80. In the off position of the parts (FIGURE 1) lip 126 abuts an arm 127 rigidly upstanding from lever 121, to prevent such counterclockwise rocking of valve plate 89 as might open inlet valve 43. The outer end of lever 121 curls freely around housing 56 to terminate at 128 within a jaw 129 secured to a manual control button 131 as by screw 132. Jaw 129 is mounted to slide up and down in a vertical side slot 133 in the attachment wall, and in FIG- URE 1 it is shown in the upper position, where no discharge of the container contents takes place.

A latch element 134 is pivoted at 135 on the inner side of plate 80, and latch 134 is formed with a tooth edge 136 adapted under certain operational conditions to engage valve plate lip 126 (see FIGURE 7) to hold the valve plate in position to depress valve pin 97, as will be described. As shown in FIGURE 2, latch 134 has an integral bent upper lip 137 extending away from plate 80.

Figure 3:
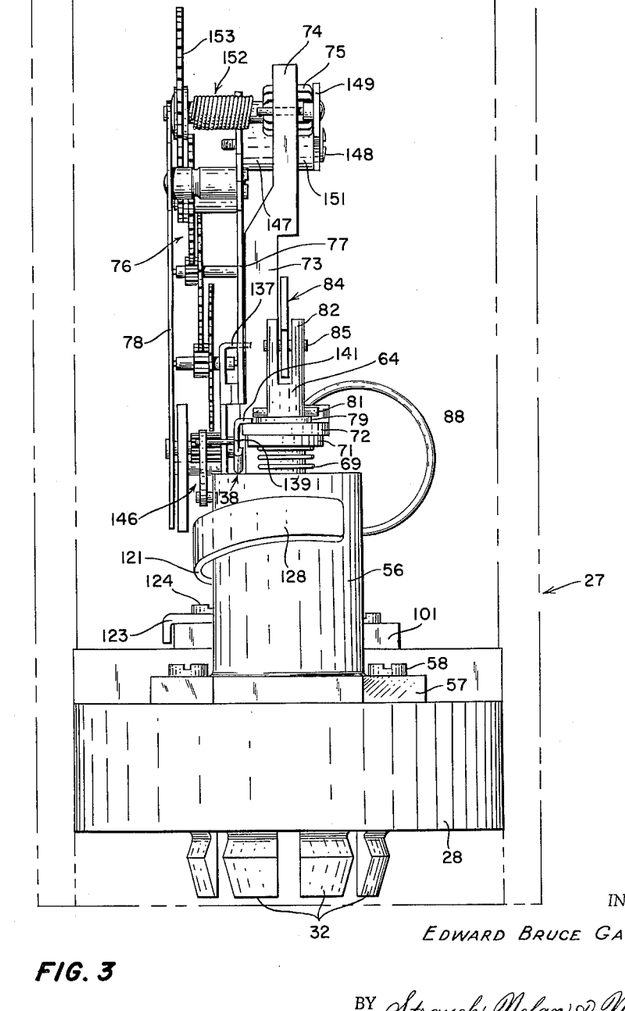
FIGURE 3 is an opposite end elevation of the parts shown in FIGURE 1.

A trip lever 138 is also pivoted at 135 on support plate 80 alongside but inwardly of latch 134. Lever 138 extends as far as the piston rod and then is formed with an upwardly bent arm 139 terminating in a lip 141 that extends over to slidingly engage the upper surface of the rack bar foot 72 as shown in FIGURE 3.

A spring 142 has one end anchored at 143 on plate 80, and its other end is attached at 144 to latch lip 137 to bias latch 134 downwardly or counterclockwise in FIGURE 1. Arm 127 on the control lever 121 terminates in a tip 145 which, when the parts are in the off position of FIGURE 1, engages the underside of latch 134 to hold latch 134 in its upwardly rocked position where tooth 136 cannot engage the valve plate 89. This energizes spring 142.

The entire escapement assembly consisting of a train of gears on shafts between plates 77 and 78 and terminating in the escapement wheel assembly at 146 is supported upon the upper inside end of plate 80 by a block 147 and screws 148. Screws 148 also extend through a strap 149 and a spacer block 151, and a resilient drive input shaft 152 for the escapement extends between the strap and outer escapement plate 78 to mount the drive gear 75 and the input gear 153 of the escapement assembly. Any suitable escapement structure may be used to time the upward displacement of rack bar 73, and any suitable time cycle may be established thereby for periodic discharge of the container contents.

FIGURE 4 as before mentioned shows the valve conditions when the attachment 27 is first placed on the container 11, with button 131 in its uppermost or off position as limited by slot 133 (FIGURE 1). Container pressure exists in chamber 38.

In order to establish periodic discharge of the container contents through opening 116, the operator pushes button 131 and jaw 129 down to the bottom of the slot 133, as shown in FIGURE 6. By this action (FIGURE 7) control lever 121 is rocked counterclockwise until arm 127 no longer blocks valve plate 89 and tip 145 is removed from abutment with latch 134.

Figure 7:
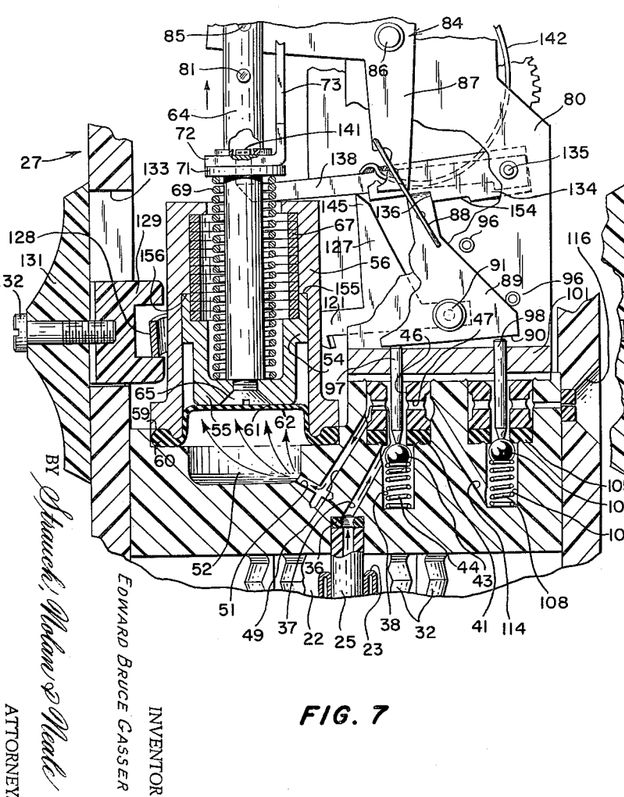
FIGURE 7 is an enlarged section like FIGURE 4 but showing the valve, passage and piston arrangements when the control lever has been shifted to the on position of FIGURE 6.

Latch 134 now swings down (clockwise) under the bias of spring 142, with an inclined cam surface 154 on its lower edge slidably engaging lip 126 and rocking valve plate 89 counterclockwise to the FIGURE 7 position where edge 90 abuts and depresses pin 97 to displace ball 43 from its seat 41. Then valve plate lip 126 seats against tooth face 136 of the latch, and lower stop 96 arrests movement of the valve plate. At this point lip 137 of the latch overlies the upper edge of trip lever 138 which has not moved.

With reference to FIGURES 4 and 7, it will be seen that, once inlet valve 43 is opened, container contents under pressure will be transmitted through valve opening 42, bore 46 and passages 47, 48, 49 and 51 to cylinder chamber 52. This immediately displaces piston 54 to its uppermost position shown in FIGURES 6 and 7, thereby compressing spring 67 substantially solid. Piston travel may be limited by solid spring 67 or by upper edge 155 abutting an internal shoulder 156 in the cylinder. This swings crank 84 clockwise about its pivot 85, and twists torsion spring 88 to the energized position shown in FIGURES 6 and 7, the lower end of spring 88 being disposed in plate 89 which cannot rock clockwise due to latch face 136.

The foregoing initial part of the periodic cycle serves to fill or charge chamber 52 with a predetermined measured volume of the pressurized fluid from the container. Now the mechanism acts automatically to discharge that predetermined amount from chamber 52 into the atmosphere through opening 116 within a predetermined time.

Trip lever 138 did not rise along with the piston since it is held down by latch lip 137 (FIGURE 2) and its end 141 rests on rack bar foot 72 through which piston rod 64 quickly slides upwardly during the foregoing piston displacement. Thus spring 69 was compressed by the upward stroke of piston 54. Upward displacement of the rack bar by expanding spring 69 now starts and is resisted and timed by the escapement 76. Therefore rack bar 73 gradually moves upwardly at a rate controlled by the escapement and, as bar foot 72 moves upwardly along the piston rod, control lever 138 is slowly rocked clockwise about its pivot 135.

Figure 8:
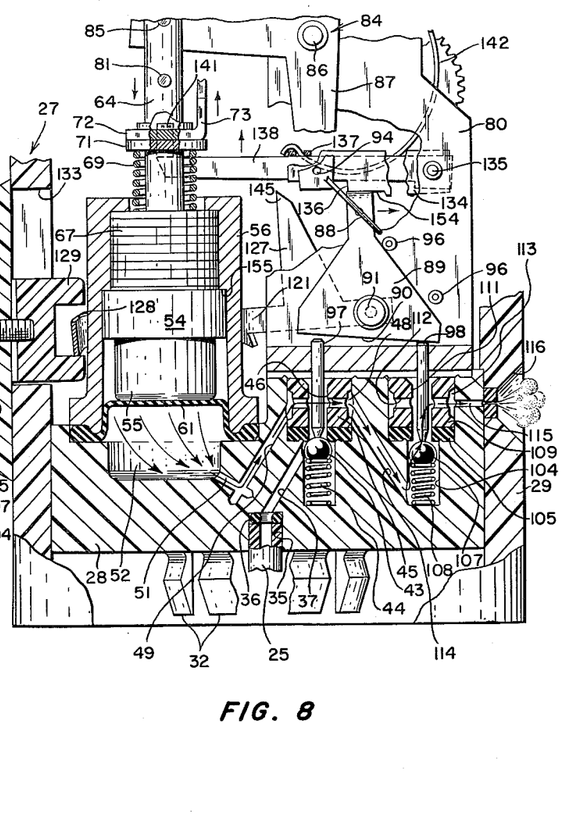
FIGURE 8 is another enlarged section like FIGURE 7 but showing the valve, passage and piston arrangements in the positions they occupy during discharge of the container material from the cylinder chamber during the periodic cycle.

After a predetermined time, lever 138, acting on latch lip 137, lifts latch 134 against the force of spring 142, until latch face 136 leaves lip 126 of valve plate 89. This frees valve plate 89 to be quickly rocked by torsion spring 88 clockwise from its FIGURE 7 to its FIGURE 8 position where edge 90 releases pin 97 to allow spring 44 to close valve 43 and engages and depresses pin 98 to displace ball 107 from opening 106. This places chamber 52 in fluid communication with discharge opening 116 through passages 51, 49, 48 and 114, chamber 104, valve opening 106, bore 111 and passages 112, 113 and 115. Since valve 43 is now closed there is no further discharge from the container. This completes the discharge portions of the periodic cycle, which is shown in FIGURE 8. Clockwise rocking of valve plate 89 is arrested by upper stop 96.

Now the parts are automatically return actuated to recharge chamber 52. When the pressure is exhausted from chamber 52, piston 54 and rod 64 retract downwardly until they are in the FIGURE 1 position. This rocks crank 84 clockwise and shifts the upper end of torsion spring 88 to the other side of the vertical plane through the connection of its lower end to valve plate 89, thereby rocking the valve plate counterclockwise sufficiently to assume the FIGURE 7 position where outlet valve 107 is closed and inlet valve 43 is open and spring 88 is oppositely twisted. Engagement of descending pin 81 with washer 79 swings trip lever 138 clockwise until latch 134 may swing downwardly clockwise under the bias of spring 142. Since control lever 121 is still in the lower or on position of FIGURE 6, there is no interference by arm 127 with this return rocking movement of valve plate 89. The valve plate 89 is once again latched by face 136. The valves 43 and 107 are now in the FIGURE 7 position, and the container fluid pressure is again admitted to fill chamber 52, thus repeating this portion of the periodic cycle.

The foregoing periodic cycle takes place as long as lever 121 is in the FIGURE 6 position and pressurized fluid issues from the container with a material time between the discharge intervals. In a preferred embodiment this periodic discharge may take place every twenty-eight minutes.

If desired, the mechanism may be set to discharge the container contents substantially continually. This is done by moving control lever 121 to its halfway intermediate position shown in FIGURE 9. The initial part of the cycle takes place as shown in FIGURE 7 whereby the chamber 52 is charged, and the next part of the cycle is illustrated in FIGURE 9 wherein chamber 52 is discharged through opening 116.

Figure 9:
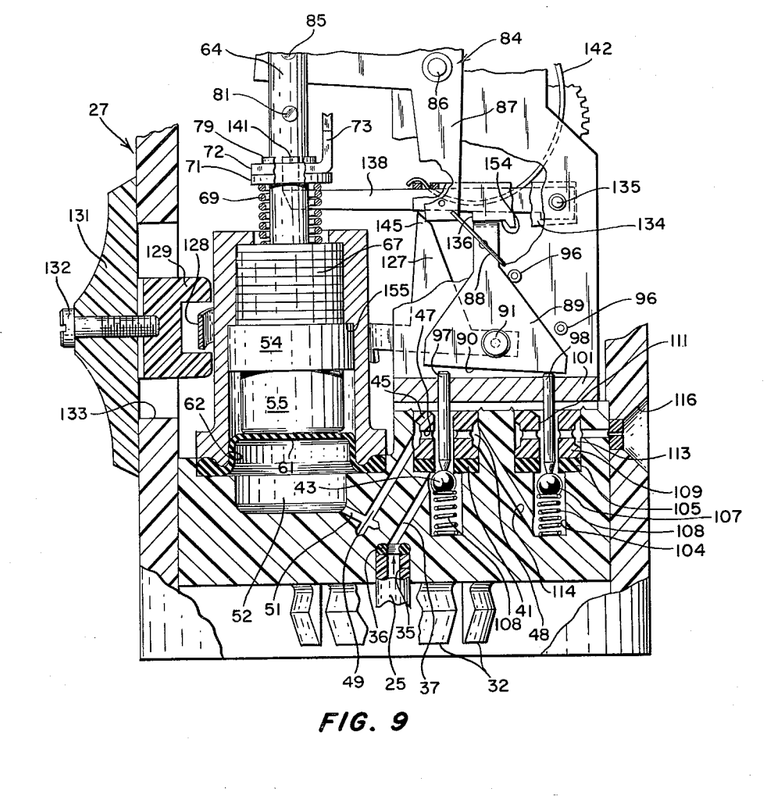
FIGURE 9 is another enlarged section like FIGURE 7 but showing the relationship of parts when the control lever is moved to the intermediate position for continual discharge of the container contents.

Movement of control lever 121 to the FIGURE 9 position has removed arm 127 from abutment with valve plate 89, but tip 145 remains engaged with latch 134 to hold the latch inoperative with respect to valve plate 89.

Therefore when crank 84 is rocked counterclockwise during discharge as soon as the upper end of spring 88 moves overcenter it swings valve plate 89 counterclockwise to the charging position where it opens valve 43. This results in piston 54 and rod 64 raising again to rock crank 84 clockwise to open valve 107 and chamber 52 is again discharged. After discharge of chamber 52, piston 54 again descends to reversely rock the valve plate to the FIGURE 7 position.

Thus the escapement and trip lever 138 do not control the timing cycle which is therefore very fast.

This continues repeatedly as long as control lever 121 is in the intermediate FIGURE 9 position. This will be called the continual discharge of the container contents because the discharge intervals, while intermittent, are so shortly spaced as to produce a continuous discharge effect, to distinguish them over the longer periodic spacing of discharge obtained when the control lever is in the lower on position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for controlling discharge of fluid from a pressurized container having an outlet, comprising means defining an expansible chamber of predetermined volume, means defining a first valved passage adapted to be connected between said container outlet and said chamber, means defining a second valved passage extending from said chamber to a discharge nozzle, mechanism responsive to expansion of said chamber when the first valved passage is open to transmit fluid under pressure from said container to said chamber for subsequently opening said second valved passage to discharge fluid under pressure from said chamber through said nozzle, and means responsive to discharge of material from said chamber for closing said second valved passage and reopening said first valved passage.

2. In the apparatus defined in claim 1, said first and second valved passages being partially coextensive.

3. In the apparatus defined in claim 1, time controlled means in said mechanism for delaying said opening of said second valved passage for a predetermined period.

4. The apparatus defined in claim 1, wherein all of said means and mechanism are mounted on an attachment having a detachable socket connection with said container that automatically disposes said outlet in fluid communication with said first valved passage means.

5. Apparatus for controlling discharge of a pressurized container of the type having a projecting hollow valve stem which when depressed into the container discharges fluid under pressure from the container therethrough comprising an attachment provided with a socket for detachable mounting on said container and means operable upon mounting said attachment on said container for receiving and depressing said valve stem so that said container is constantly open to supply fluid under presssure from said container into a connecting passage in said attachment, and means in said attachment energized by fluid under pressure from said container for periodically discharging a predetermined volume of said fluid from the attachment into the atmosphere at predetermined intervals.

6. Apparatus for controlling periodic discharge of fluid from a pressurized container having an outlet comprising means defining an expansible chamber of predetermined volume, means defining a first valve passage adapted to connect the container outlet to said chamber, means defining a second valved passage connecting said chamber to a discharge nozzle, manually controlled means for opening said first valved passage to admit fluid under pressure into said chamber, time controlled means actuated by expansion of said chamber for opening said second valved passage for discharging fluid from said chamber through said nozzle, and means automatically operable when said fluid has been dispensed from said chamber for closing said second valved passage and reopening said first valved passage, said means cyclically repeating to effect periodic discharge of said fluid in said predetermined volume at measured intervals determined by said time control means.

7. Apparatus for controlling discharge of fluid from a pressurized container of the type having a projecting hollow valve stem which when depressed into the container discharges fluid under pressure from the container therethrough, comprising an attachment provided with a socket for detachable mounting on said container, means on said attachment defining an expansible chamber of predetermined volume, means defining a first passage having one end formed for sealing connection with said stem and its other end opening into said chamber, a first valve in said inlet passage, means defining a second passage between said chamber and a discharge outlet, a second valve in said second passage, said valves being biased toward closed position, mechanism for cyclically alternatively opening and closing said valves for periodically charging said chamber with said fluid and discharging the chamber contents through said outlet, and manually operated means for holding said mechanism against said cyclic operation actuatable to release said mechanism and effect initial opening of said first valve to start said operational cycle.

8. In the apparatus defined in claim 7, time control means in said mechanism effective to open said second valve a predetermined time after said chamber has been charged.

9. Apparatus for controlling dischrge of fluid from a pressurized container of the type having a projecting hollow valve stem which when depressed into the container discharges fluid under pressure from the container therethrough comprising an attachment provided with a socket for detachable mounting on said container, means on said attachment defining an expansible chamber of predetermined volume, means defining a first passage having one end formed for sealing connection with said stem and its other end opening into said chamber, a first valve in said inlet passage, means defining a second passage between said chamber and a discharge outlet, a second valve in said second passage, said valves being normally biased toward closed position, mechanism for cyclically opening and closing said valves for periodically charging said chamber with fluid and discharging the chamber through said outlet comprising a valve operating member shiftable between positions where it alternately opens and closes said valves and operably connected to be actuated by expansion and contraction of said chamber, and manually operated means for holding said mechanism against said cyclic operation actuatable to release said mechanism and effect initial opening of said first valve to start said operational cycle.

10. In the apparatus defined in claim 9, said manually operated means comprising a pivoted lever abutting said valve operating member when in said mechanism holding position.

11. Appartus for controlling discharge of fluid from a pressurized container comprising a cylinder, a slidable piston in said cylinder defining an expansion chamber with one end of said cylinder, means defining a fluid inlet passage to said chamber, said passage being formed at the end opposite said chamber to receive fluid under pressure from said container, a normally closed valve in said passage, means defining a fluid outlet passage from said chamber terminating in a discharge outlet, a normally closed valve in said outlet passage, and valve operating means for alternately opening and closing said valves to charge said chamber and then discharge its contents through said outlet comprising a pivoted member and motion transmitting means adapted to connect said member to said valves and mechanism for actuating said valve operating member comprising a piston rod movable with said piston, a pivoted crank operably connected at one end to said piston rod, and a torsion spring connecting the other end of said crank to said member.

12. In the apparatus defined in claim 11, a pivoted latch spring biased toward engagement with said pivoted member, and a pivoted trip lever adapted to swing said latch away from said pivoted member after said chamber has expanded.

13. Apparatus for controlling discharge of fluid from a pressurized container comprising a cylinder, a slidable piston in said cylinder defining an expansion chamber with one end of said cylinder, means defining a fluid inlet passage to said chamber, said passage being formed at the end opposite said chamber to receive fluid under pressure from said container, a normally closed valve in said passage, means defining a fluid outlet passage from said chamber terminating in a discharge outlet, a normally closed valve in said outlet passage, valve operating means for alternately opening and closing said valves to charge said chamber and then discharge the contents thereof through said outlet comprising a pivoted member and motion transmitting means adapted to connect said member to said valves and mechanism for actuating said valve operating member comprising a piston rod movable with said piston, a pivoted crank operably connected at one end to said piston rod and a torsion spring connecting the other end of said crank to said member, and a pivoted control lever for said mechanism movable between an "off" position where it arrests movement of said pivoted valve member and another position where it releases said pivoted valve member for valve actuation.

14. Apparatus for controlling discharge of fluid from a pressurized container comprising a cylinder, a slidable piston in said cylinder defining an expansion chamber with one end of said cylinder, means defining a fluid inlet passage to said chamber, said passage being formed at the end opposite said chamber to receive fluid under pressure from said container, a normally closed valve in said passage, means defining a fluid outlet passage from said chamber terminating in a discharge outlet, a normally closed valve in said outlet passage, valve operating means for alternately opening and closing said valves to charge said chamber and then discharging its contents through said outlet comprising a pivoted member and motion transmitting means adapted to connect said member to said valves and mechanism for actuating said valve operating member comprising a piston rod movable with said piston, a pivoted crank operably connected at one end to said piston rod and a torsion spring connecting the other end of said crank to said member, a pivoted control lever for said mechanism shiftable into and out of engagement with said pivoted member, a pivoted latch spring biased toward latching engagement with said control lever, a pivoted trip lever adapted to displace said latch away from said pivoted member, and time controlled means operatively connecting said piston to said trip lever whereby said trip lever is swung to displace said latch a predetermined time after said chamber expands.

15. In the apparatus defined in claim 14, said time controlled means comprising an escapement having a gear, a rack meshed with said gear and slidable on said piston rod, spring means compressed between said rack and said piston, and means operatively connecting the free end of said trip lever to move with said rack.

16. Apparatus for controlling discharge of fluid from a pressurized container comprising a cylinder, a slidable piston in said cylinder defining an expansion chamber with one end of said cylinder, means defining a fluid inlet passage to said chamber, said passage being formed at the end opposite said chamber to receive fluid under pressure from said container, a normally closed valve in said passage, means defining a fluid outlet passage from said chamber terminating in a discharge outlet, a normally closed valve in said outlet passage, valve operating means for alternately opening and closing said valves to charge said chamber and then discharge its contents through said outlet comprising a pivoted member and motion transmitting means adapted to connect said member to said valves and mechanism for actuating said valve operating member comprising a piston rod movable with said piston, a pivoted crank operably connected at one end to said piston rod and a torsion spring connecting the other end of said crank to said member, said torsion spring comprising a generally C-shaped wire spring having its opposite ends pivoted in said crank and said member and disposed to be oppositely twisted upon movement of said pivoted member to said valve operating positions.

17. Appartus for controlling discharge of fluid from a pressurized container of the type having a projecting hollow valve stem which when depressed into the container discharges fluid under pressure from the container therethrough, comprising an attachment provided with means for detachable assembly with said container, means on said attachment defining an expansible chamber of predetermined volume, a first passage having one end formed for fluid transmitting connection with said stem and its other end opening into said chamber, a first valve in said inlet passage, means defining a second passage between said chamber and a discharge outlet, a second valve in said second passage, means effective upon assembly of said container and attachment for depressing said stem to start discharge of said fluid into said first passage, and mechanism for cyclically alternatively opening and closing said valves for periodically charging said chamber with said fluid and discharging the chamber contents through said outlet.

References Cited by the Examiner

UNITED STATES PATENTS

| 1,769,499 | 7/30 | Dupuy | 225—335 |
| 2,651,439 | 9/53 | Stevenson. | |
| 3,107,821 | 10/63 | Lambert | 222—477 |

LOUIS J. DEMBO, *Primary Examiner.*

HADD S. LANE, *Examiner.*